United States Patent
Ogino et al.

[11] Patent Number: 5,181,127
[45] Date of Patent: Jan. 19, 1993

[54] IMAGE FORMING APPARATUS AND METHOD THEREFOR

[75] Inventors: Shigeo Ogino, Toyokawa; Masaaki Nishiyama, Toyohashi, both of Japan

[73] Assignee: Minolta Camera Kabushiki Kaisha, Osaka, Japan

[21] Appl. No.: 552,083

[22] Filed: Jul. 13, 1990

[30] Foreign Application Priority Data

Jul. 17, 1989 [JP] Japan ................................. 1-185263

[51] Int. Cl.⁵ ............................................. H04N 1/40
[52] U.S. Cl. ................................... 358/443; 358/429; 358/455; 358/248; 358/296; 358/446; 358/447
[58] Field of Search ............... 358/455, 456, 457, 458, 358/459, 460, 461, 462, 443, 446, 447, 448, 449, 453, 452, 429, 296, 298, 466

[56] References Cited

U.S. PATENT DOCUMENTS

| | | | |
|---|---|---|---|
| 4,763,199 | 8/1988 | Suzuki | 358/445 |
| 4,782,398 | 11/1988 | Mita | 355/436 |
| 4,873,428 | 10/1989 | Takeuchi et al. | 358/494 |
| 5,032,928 | 7/1991 | Sakai et al. | 358/448 |
| 5,101,283 | 3/1992 | Seki et al. | 358/457 |

Primary Examiner—Stephen Brinich
Assistant Examiner—Jerome Grant, II
Attorney, Agent, or Firm—Burns, Doane, Swecker & Mathis

[57] ABSTRACT

An image forming apparatus such as a digital color copy machine is disclosed. The image forming apparatus provides an image reader, an amplifier for amplifying image signals read by the image reader, a laser driver for driving a laser diode to form an image on a recording medium and a switching circuit for switching the amplification gain according to the kind of image to be formed.

7 Claims, 7 Drawing Sheets

IMAGE FORMING APPARATUS AND METHOD THEREFOR

BACKGROUND OF THE INVENTION

1. FIELD OF THE INVENTION

The present invention relates to an image forming apparatus such as a digital color copy machine and to a method therefor.

2. DESCRIPTION OF RELATED ART

Generally speaking, a known digital color copy machine is comprised of an image reader for reading a document by a color image sensor and converting color image signals read to gradation data and a printer for printing an image responsive to the gradation data by an electrophotographic method. In the printer, the gradation data are converted into binary print image signals by performing a binarizing processing to them and, thereafter, a laser diode is driven responsive to the print image signals to form an image by scanning the laser beam emitted from the laser diode on a photoconductive drum.

In the digital color copy machine of this type, dots, for example in a form of (N×N) matrix are made correspond to one picture element as one block in order to represent gradations of ($N^2+1$) and, in general, the dither method is widely used to reproduce half-tone images having much more gradations. However, this method has such a disadvantage in that the image resolution is lowered to increase the number of gradations due to an enlargement of the block assuming the dot size is constant and, to the contrast, the number of gradations has to be reduced in order to enhance the image resolution.

Also, pulse-width modulation method or intensity modulation method has been used as a method for representing gradations to one dot to be printed. In the pulse-width modulation method, so called triangular wave method has been utilized (see, for example, U.S. Pat. No. 4,763,199 and U.S. Pat. No. 4,782,398). In the method, the size of one dot is realized by varying the amount of exposure light of the laser beam to the photoconductive drum according to the print image signals.

In the digital color copy machine, an electrostatic latent image is formed on the photoconductive drum by driving the laser diode responsive to print image signals using the above intensity modulation method, the latent image is developed with toner to form a toner image and then the toner image formed is transferred on a copy paper. As well known to those skilled in the art, the relationship of the gradation degree (density) of the toner image to that of a document image becomes such a relationship as indicated by a reference numeral 91 in FIG. 4.

This characteristic is called γ-characteristic wherein the gradient thereof becomes large in a range of the medium gradation and becomes small i.e. saturated in a range of the high gradation as indicated by a reference numeral 91a. Accordingly, thin characters of a document image are printed thinly and, upon copying a half-tone image such as a photograph having high gradations, the faithfulness of the printed image is lowered since the number of gradation is decreased substantially in the range of the high gradation as is apparent from the characteristic 91a.

SUMMARY OF THE INVENTION

An essential object of the present invention is to provide image forming apparatus and method therefor being capable of increasing the number of gradations substantially upon printing a half-tone image such as a photograph while increasing the resolution upon printing characters in order to print them clearly.

Another object of the present invention is to provide image forming apparatus and method therefor being capable of altering the gain of amplification to image signals according to the kind of image data.

In order to accomplish these objects, according to the present invention, there is provided an image forming apparatus for forming an image on a recording medium by scanning a laser beam on said recording medium including a reading means for reading a document image and outputting analog image signals having a plurality of gradations, an amplifier means for amplifying said analog signals, a driving means for supplying an energizing current responsive to said analog signals amplified to a laser emitting means and an altering means for altering the gain of said amplifier means.

Also, there is provided an image forming method for an image forming apparatus which forms an image on a recording medium by scanning a laser beam on said recording medium including the following steps;

a step for reading a document image and outputting analog image signals having a plurality of gradations, a step for amplifying image signals responsive to said halftone image area at a first amplification degree and image signals responsive to said character image area at a second amplification degree higher than the first one, and a step for supplying an energizing current responsive to said image signals amplified to said laser emission means.

Namely, according to the present invention, the amplification gain to image signals is altered according to the kind of the image data. In the present invention, the amplification gain to image signals corresponding to a half-tone image is set at a value lower than that corresponding to an image including only characters.

This indicates that the number of gradations is increased to the half-tone image substantially since the gradient of the γ-characteristic is lowered in the range of the high gradation while the resolution to the character image is enhanced since it is increased in the range of the low gradation.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

[I] Composition of Digital color copy machine

Figure 1:
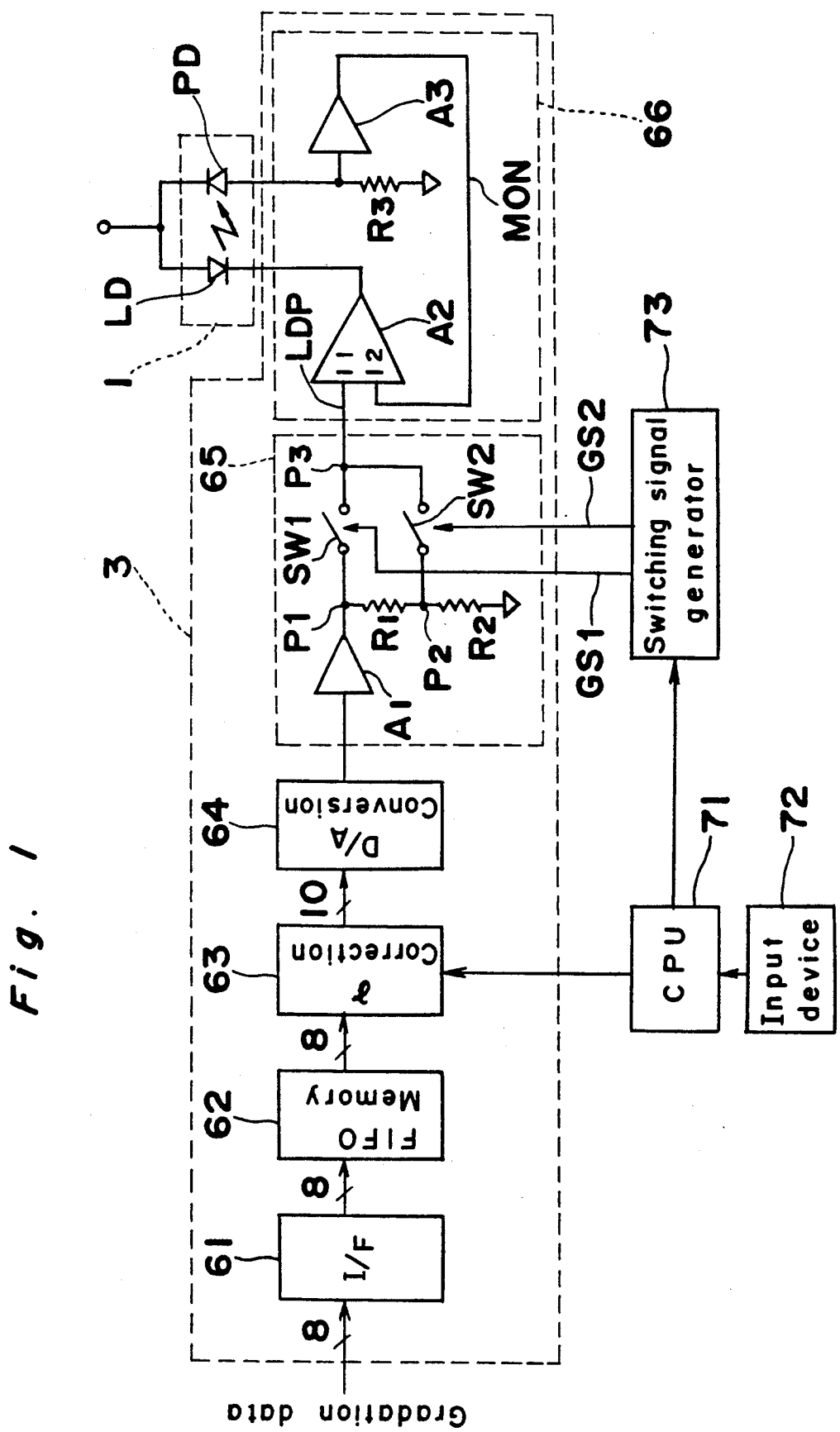
FIG. 1 is a block diagram for showing a composition of a print head of a digital color copy machine according to the preferred embodiment of the present invention.

As shown in FIG. 1, the digital color copy machine according to the present invention is comprised of an image reading section 100 for reading a document using a CCD color image sensor 14 and outputting gradation data and a printer section 200 for converting said gradation data to signals for driving a laser diode LD and for printing an image on a copy paper by the electro-photographic method. The printer section 200 according to the present invention is characterized in that the amplification gain for the driving signal of the laser diode LD is switched responsive to the kind of an image to be printed.

In the digital color copy machine, the reading of the document by the image reader section 100 is done in every color repeatedly in the multi-color copy mode and the printing of the image by the printer section 200 is done repeatedly to one copy paper.

Figure 2:
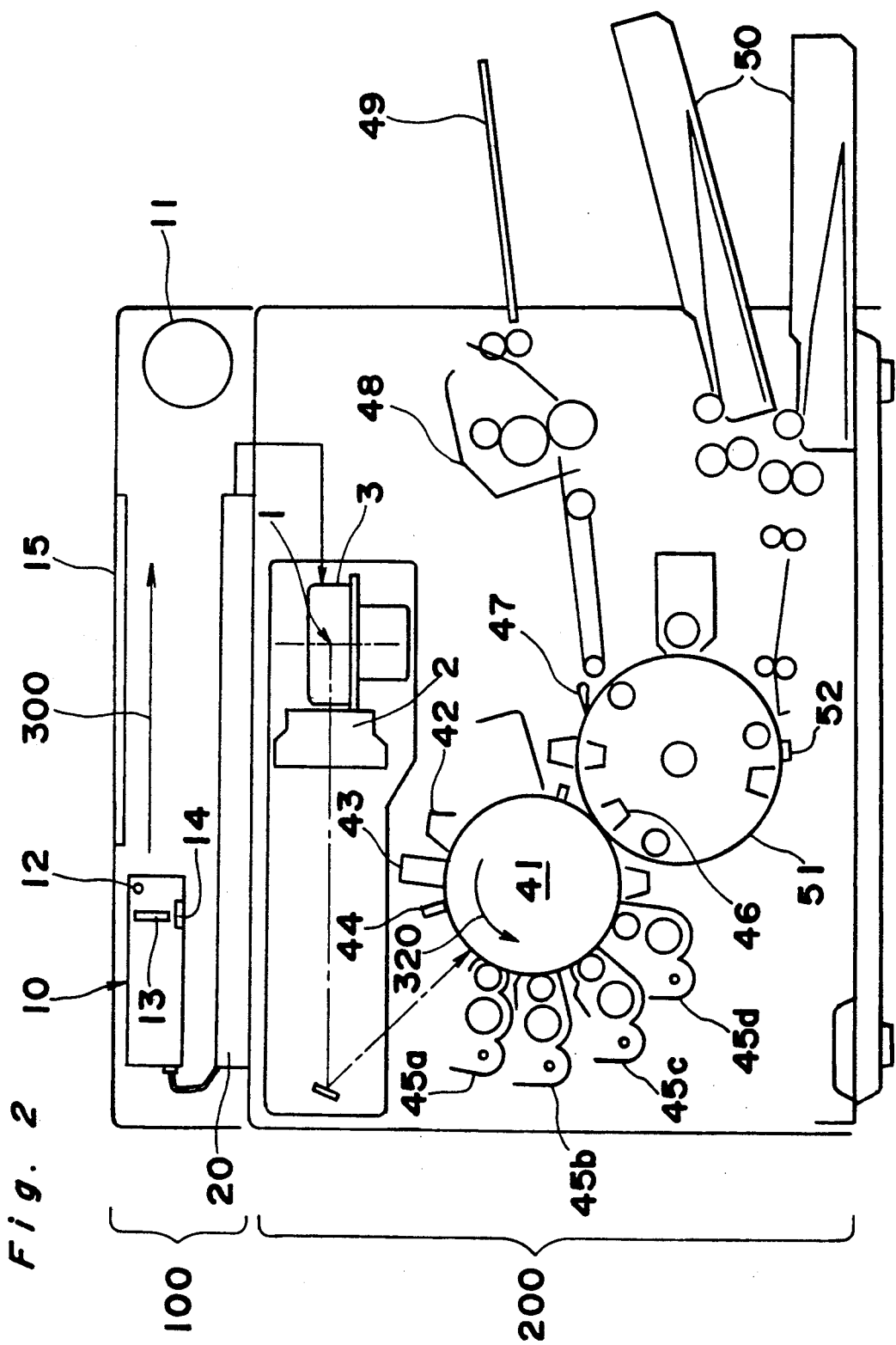
FIG. 2 is a schematic sectional view of the digital color copy machine.

FIG. 2 is a schematic sectional view of the digital color copy machine according to the present invention.

In FIG. 2, a scanner 10 provides an exposure lamp 12 for illuminating a document, a rod-lens array 13 for collecting lights reflected from the document and a CCD color image sensor 14 of contact type for converting collected lights to electric signals. The scanner 10 is driven by a motor 11 upon reading a document set on a platen 15 and is moved in a direction (sub-scan direction) indicated by an arrow 300. The image of the document illuminated by the exposure lamp 12 is converted photoelectrically by the image sensor 14. Multi-valued electric signals of three colors R(red), G(green) and B(blue) obtained by the image sensor 14 are converted to gradation data of 8 bits regarding either of yellow(Y), magenta(M), cyan(C) and black(K) by the read image processor section 20. Next, the print head 3 performs a γ-correction to the gradation data inputted according to properties of each toner to be used and, thereafter, generates driving signals for the laser diode LD by converting corrected image data to digital gradation data to drive the laser diode LD in a semiconductor laser 1. According to the present invention, a switching processing of the amplification gain is done according to the kind of the image data in the print head 3. This feature will be explained in detail later with reference of FIG. 1.

A laser beam emitted from the laser diode LD in response to the gradation data is projected, via a reflection mirror, onto a photoconductive drum 41 being driven to rotate in a direction as indicated by an arrow 320 in FIG. 2. Due to this, an image of the document is formed on the drum 41. The drum 41 is irradiated by an eraser lamp 42, electrified by an electrifying charger 43 and irradiated by a sub-eraser lamp 44 before the exposurement at every printing operation. When it is exposed in a state uniformly electrified, an electro-static latent image is formed thereon. The latent image on the drum 41 is developed using toner contained in a developing unit selected among yellow, magenta, cyan and black developing units 45a to 45d. The developed image is transferred onto a copy paper wound around a transfer drum 51 by a transfer charger 46.

The printing action is repeated with respect to colors of yellow, magenta, cyan and black. The scanner 10 repeats the scanning operation in synchronization with actions of the drum 41 and the transfer drum 51. Then, the copy paper is detached from the transfer drum 51 by operating a separation claw 47, past through a fixing device 48 and discharged on a discharge tray 49. The copy paper is fed from a cassette 50 containing copy papers and the top end thereof is chucked by a chucking mechanism 52 arranged on the transfer drum 51 in order to prevent the copy paper from shifting.

[II] Read image processor section 20

Figure 3:
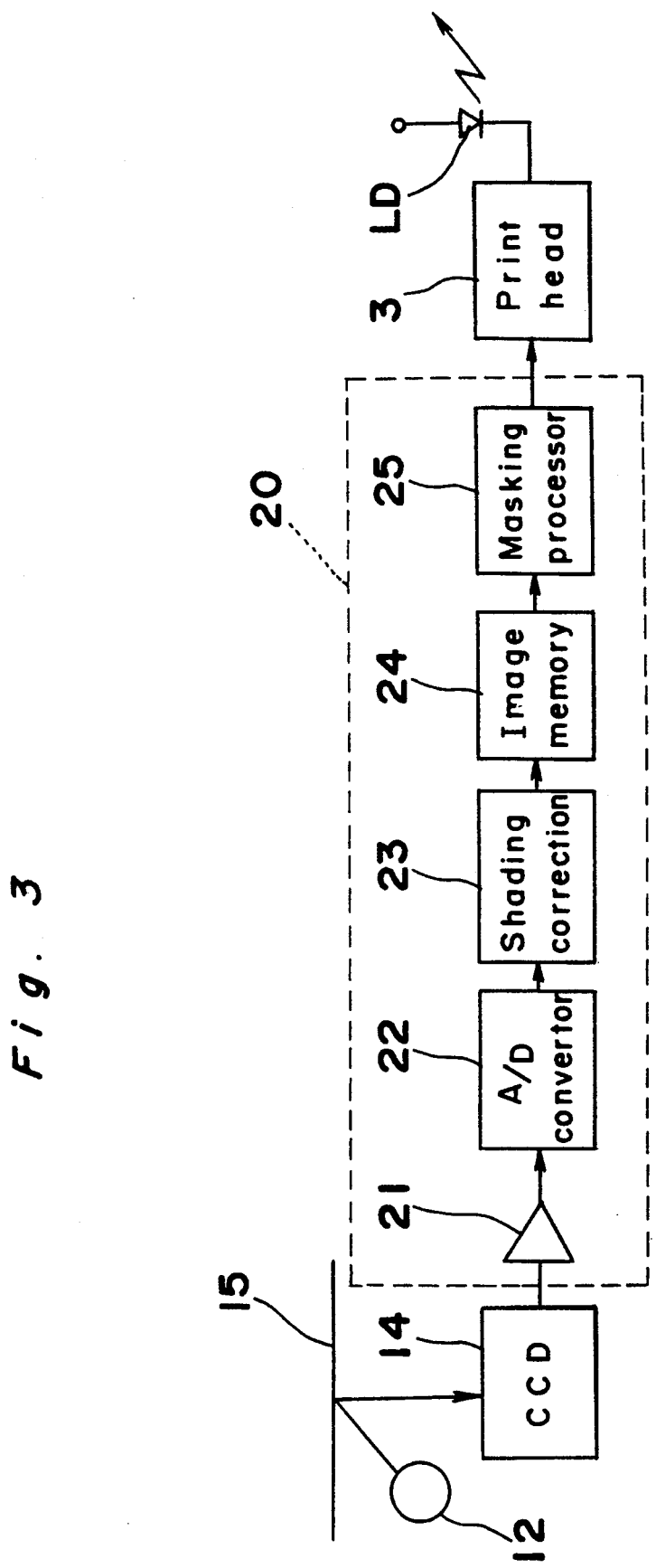
FIG. 3 is a block diagram showing a composition of the processing circuit for read image signals.

The read image processor 20 for outputting gradation data by processing output signals from the CCD color image sensor 14 is explained referring to FIG. 3.

As shown in FIG. 3, image signals obtained by the CCD color sensor 14 are converted to image densities by a log-amplifier 21 and the image density data are further converted to multi-valued digital image data of R, G and B by an analog to digital converter 22. These R, G and B image data are respectively subjected to a predetermined shading correction by a shading correction circuit 23 and then, memorized in an image memory 24.

Next, a masking processing circuit 25 generates gradation data with respect to each color of yellow, magenta, cyan and black based upon image data of three colors R, G and B memorized in the image memory circuit 24 and outputs them to the print head 3 in order to print in each color successively.

The print head 3 performs a γ-correction corresponding to the developing property of the copy machine to the gradation data inputted, generates driving signals for the laser diode LD by performing a digital to analog conversion with respect to the corrected image data and drives the laser diode LD responsive to converted signals.

The sequential processings from reading the image data from the image memory 24 to printing by driving the laser diode LD are done with respect to each color in the order of yellow, magenta, cyan and black and, thereby, a full color image is printed on a copy paper.

In order to synchronize the image reading by the CCD color image sensor with the image data processing by the signal processor 20 and the image data processing by the signal processor 20 and the print head 3 in the horizontal direction, horizontal synchronization signals and clock signals are used as well known to those skilled in the art. The image data of R, G and B from the CCD color sensor 14 are processed serially in synchronization with the clock signals and lines in a direction of main scan are renewed every time when the horizontal synchronization signal is generated. The scanner 10 moves by a unit distance in the sub-scan direction upon renewal of the line.

[III] Composition of Print head 3

FIG. 1 is a block diagram showing a composition of the print head 3.

As shown therein, gradation data of 8 bits outputted from the masking circuit 25 of the read signal processing section 20 are inputted, via an interface circuit 61 for performing interface processings such as signal conversion processings, into a first-in first-out memory 62 (hereinafter referred to as FIFO memory). The FIFO memory 62 is a line buffer memory capable of memorizing gradation data of a predetermined number of lines in the main scan direction and is provided because the action clock frequency of the image reading section 100 is different from that of the print head 3.

A γ-correction circuit 63 includes a correction table comprised of a ROM which memorizes data of plural γ-correction curves for correcting the γ-characteristic i.e. the characteristic of the toner density of an image to be printed on a copy paper so as to become linear. This correction circuit 63 selects one γ-correction curve responsive to correction data inputted from the FIFO memory 62 to gradation data of 10 bits based upon the γ-correction curve selected and outputs the corrected gradation data, via a digital to analog conversion circuits 64, to a gain switching circuit 65.

In the gain switching circuit 65, gradation analog signals inputted from the D/A conversion circuit 64 are inputted via an amplifier A1, to a connection point P1. The gradation analog signals amplified by the amplifier A1 are outputted, via a switch SW1 and a connection point P3, to a laser diode controller 66 as driving signals and each of the signals inputted to the connection point P1 is divided in the potential thereof by resistances R1 and R2. The divided potential is outputted, via a switch SW2 and a connection point P3, to the laser diode controller as the driving signal. Respective switches SW1 and SW2 are switched on or off by switching signals GS1 and GS2 inputted from a switching signal generation circuit 73. The switching signal GS2 is an inversion of the switching signal GS1. When GS1 is in a high level and GS2 is in a low level, the switch SW1 is turned on and the switch SW2 is turned off. In this state, the gradation analog signals inputted from the D/A conversion circuit 64 are outputted to the laser diode controller 66 via the switch SW1 after being amplified by the amplifier A1. On the other hand, when respective switching signals GS1 and GS2 are inverted from the above state, the switch SW1 is turned off and the switch SW2 is turned on. In this state, the gradation analog signals amplified by the amplifier A1 are divided in the potential with a damping ratio L (L=R2/(R1+R2)) and each divided signal is outputted to the laser diode controller 66 via the switch SW2. Accordingly, the gain switching circuit 65 switches, according to the switching signals GS1 and GS2, whether the potential of the gradation analog signal outputted from the amplifier A1 is outputted as it is or the potential divided with the damping ratio is outputted.

In the preferred embodiment, values of the resistances R1 and R2 are set at 2 kΩ and 8 kΩ, respectively and, therefore, the damping ratio L is set at 0.8. Namely, the gain of the gain switching circuit 65 becomes equal to that of the amplifier A1 (hereinafter referred to as the first gain) when the switch SW1 is on and the switch SW2 is off and becomes equal to product of the gain of the amplifier A1 and the damping ratio (0.8) (hereinafter referred to as the second gain).

In the laser diode controller 66, the potential LDP of the driving signal inputted from the gain switching circuit 65 is inputted to a first input terminal I1 of a second amplifier A2 and the laser diode LD in the semiconductor laser 1 is driven by signals outputted from the amplifier A2. In the semiconductor laser 1, a photodiode PD is provided for monitoring the output of the laser diode LD. The output of the photodiode PD is inputted to a second input terminal I2 of the second amplifier A2 via third amplifier A3 as a feedback potential signal MON and, thereby, a feedback control system is constituted. Namely, the light output of the laser diode LD is controlled so as for the driving signal potential LDP to become equal to the feedback potential signal MON.

Figure 4:
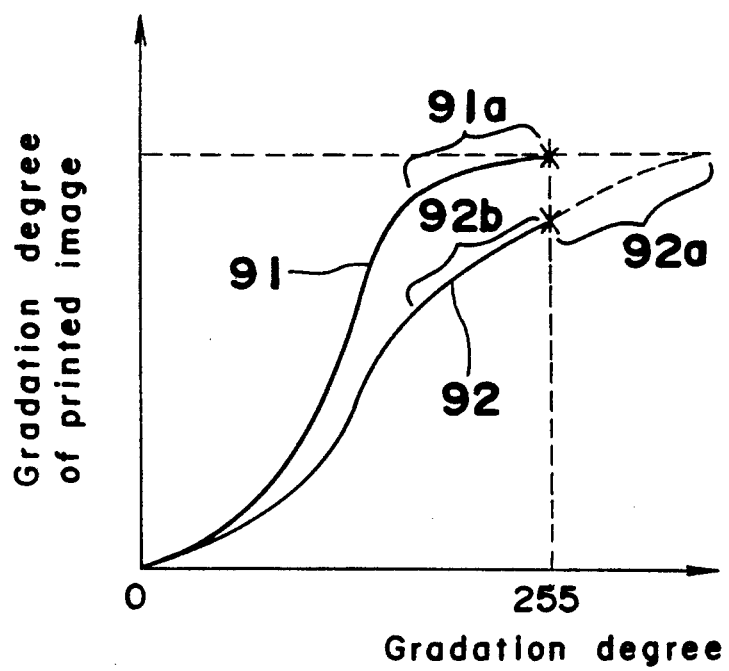
FIG. 4 is a graph for showing so called γ-characteristic of the gradation of a printed image to the gradation degree.

FIG. 4 shows γ-characteristics defined as characteristics of the gradation of the printed image to the gradation degree of the gradation data.

In FIG. 4, the γ-characteristic indicated by 91 is that to be used when the gain switching circuit 65 has the first gain and the γ-characteristic indicated by 92 is that to be used when the gain switching circuit 65 has the second gain smaller than the first one.

As is shown in FIG. 4, γ-characteristics 91 and 92 have saturated characteristics 91a and 92a in the range of high gradation.

In this copy machine, the gain switching circuit 65 is switched to select the first gain for an image including characters in a document image. Namely, the image including characters is realized according to the γ-characteristic 91. On the other hand, the second gain is selected for an image including a half-tone image such as a photograph in order to realize the image according to the γ-characteristic 92. As shown in FIG. 4, the γ-characteristic 91 has a large gradient in a range of low gradation and, therefore, characters are printed thickly and clearly even if they are thin. Further, the γ-characteristic 92 has a gradient substantially proportional to gradation data inputted in a range of high gradation, as indicated by a reference numeral 92b in FIG. 4, and, therefore, it becomes possible to increase the number of gradation degrees to a half-tone image substantially. Accordingly, the half-tone image is reproduced by the γ-characteristic 92 faithfully.

In this preferred embodiment, there is provided an input advice 72 for designating areas of half-tone images.

Figure 5:
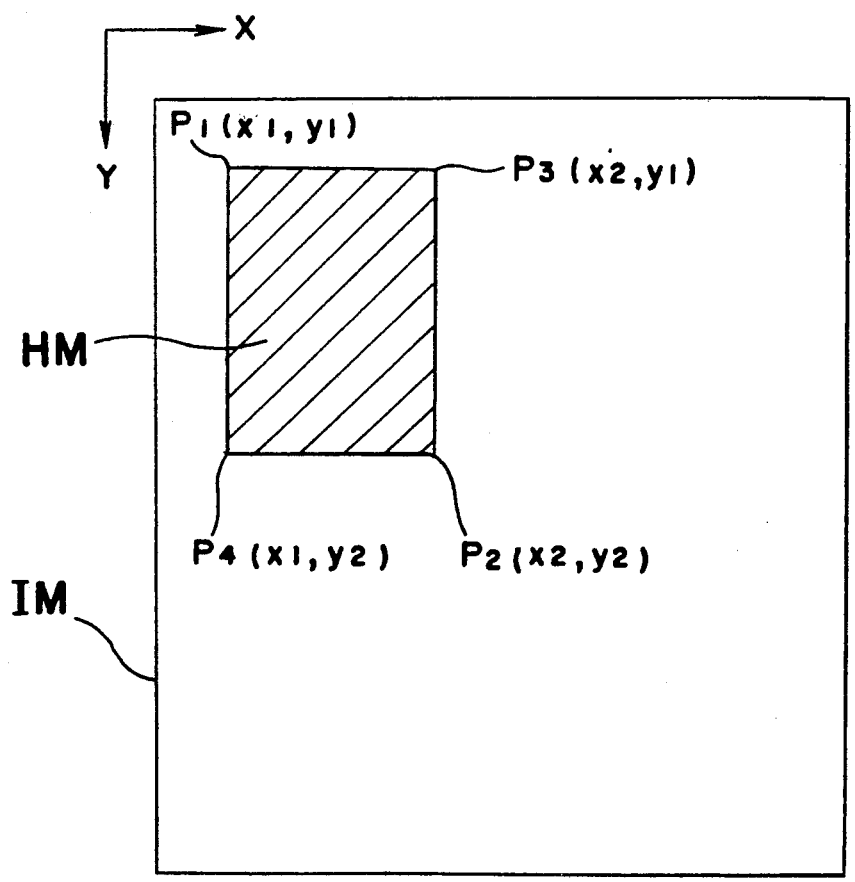
FIG. 5 is a view showing an image including a half-tone image.

FIG. 5 shows a schematic example of a document image IM including a rectangular half-tone image HM such as a photograph. Arrows X and Y indicate the main scan direction and the sub-scan direction, respectively. $P_1$, $P_2$, $P_3$ and $P_4$ indicate points of left upper, right lower, right upper and left lower corners of the half-tone image HM and are assumed to have coordinates $(x_1, y_1)$, $(x_2, y_2)$, $(x_3, y_3)$ and $(x_4, y_4)$, respectively.

An operator inputs coordinates of the points $P_1$ and $P_2$ of the half-tone image HM using the input device 72. These coordinate data are inputted to the CPU 71 and the same outputs four count data to be counted by four counters provided in the switching signal generation circuit 73 based upon the coordinate data inputted.

[IV] Composition of Switching signal generation circuit 73

Figure 6:
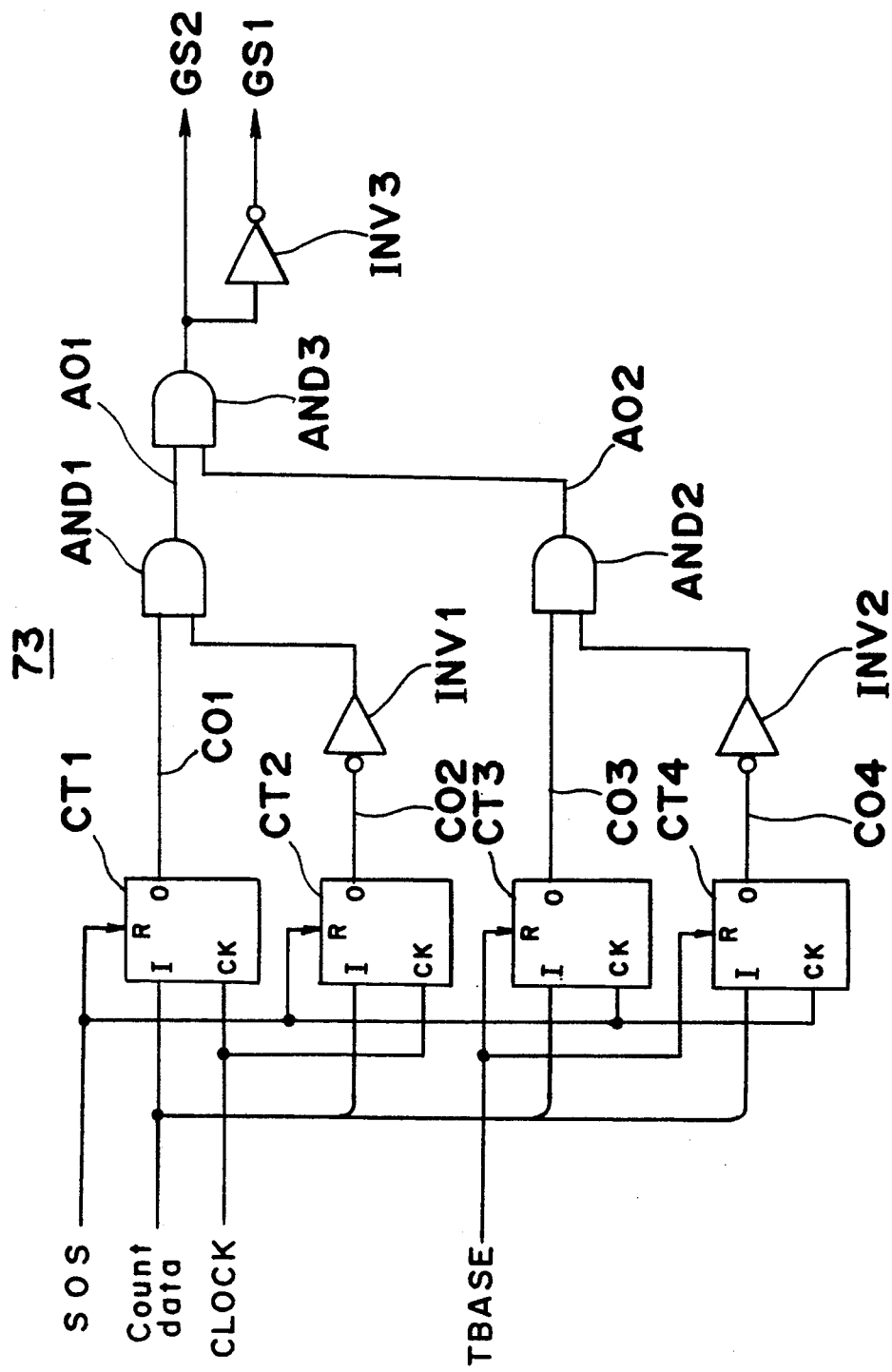
FIG. 6 is a circuit for generating switching signals.

FIG. 6 shows a composition of the switching signal generation circuit 73 for generating switching signals GS1 and GS2 to be outputted to the gain switching circuit 65.

The switching signal generation circuit 73 provides four up-counters CT1 to CT4, three inverters INV1 to INV3 and three AND gates AND1 to AND 3. A signal for starting a scan in the main scan direction (hereinafter, referred to as SOS signal) which is generated by a generation circuit for the SOS signal (not shown) is inputted to reset terminals R of the up-counters CT1 and CT2 and clock terminals CK of the up-counters CT3 and CT4. Four count data outputted from the CPU1, when coordinate data of the half-tone image are inputted using the input device 72, are set in the up-counters CT1 to CT4, respectively. Further, each clock signal CLOCK having a predetermined time interval is inputted to the up-counters CT1 and CT2 and a page start signal TBASE indicating a start position of a page of the document is inputted to reset terminals R of the up-counters CT3 and CT4. Each up-counter resets an output signal from "high" level to "low" level at a timing of the drop of a signal inputted to the reset terminal R and increments the count value by one when a clock signal CLOCK is inputted to the clock terminal CK. When the count value becomes equal to the value set by the CPU1, the switching signal generation circuit raises the output signal from "low" level to "high" level.

An output signal C01 from the up-counter CT1 is inputted to a first input terminal of the AND gate AND1 and an output C02 from the up-counter CT2 is inputted to the second input terminal of the AND gate AND2 via the inverter. An output signal A01 of the AND gate AND2 is inputted to a first input terminal of the AND gate AND3. An output signal C03 of the up-counter CT3 is inputted to the first input terminal of the AND gate AND2 and an output signal C04 of the up-counter CT4 is inputted, via the inverter INV2, to the second input terminal of the AND gate AND2. An output signal A02 from the AND gate AND2 is inputted to the second input terminal of the AND gate AND3. Further, an output signal from the AND gate AND3 is outputted as the switching signal GS2 and is inverted by the inverter INV3 to output as the switching signal GS1.

Figure 7A:
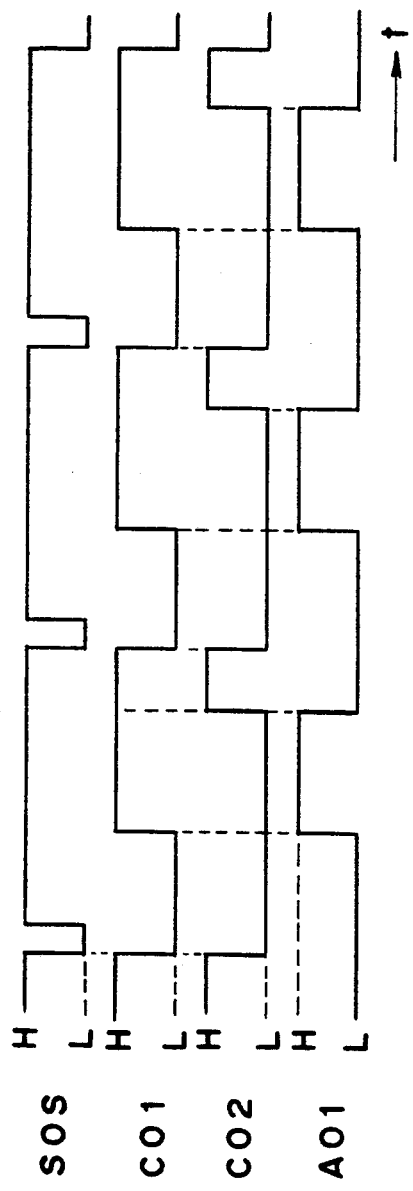
FIG. 7(A), 7(B), 7(C) are timing charts showing actions of the switching signal generation circuit.
Figure 7B:
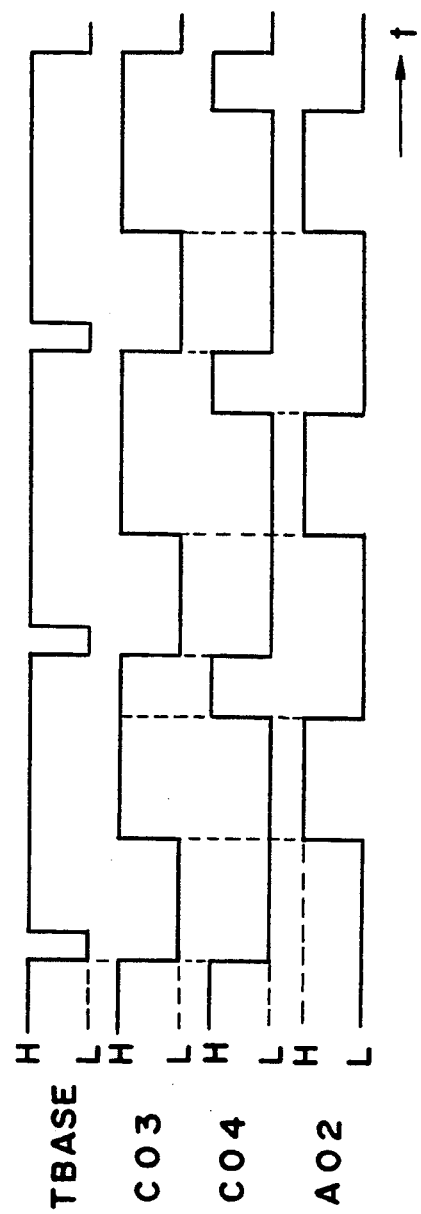
Figure 7C:
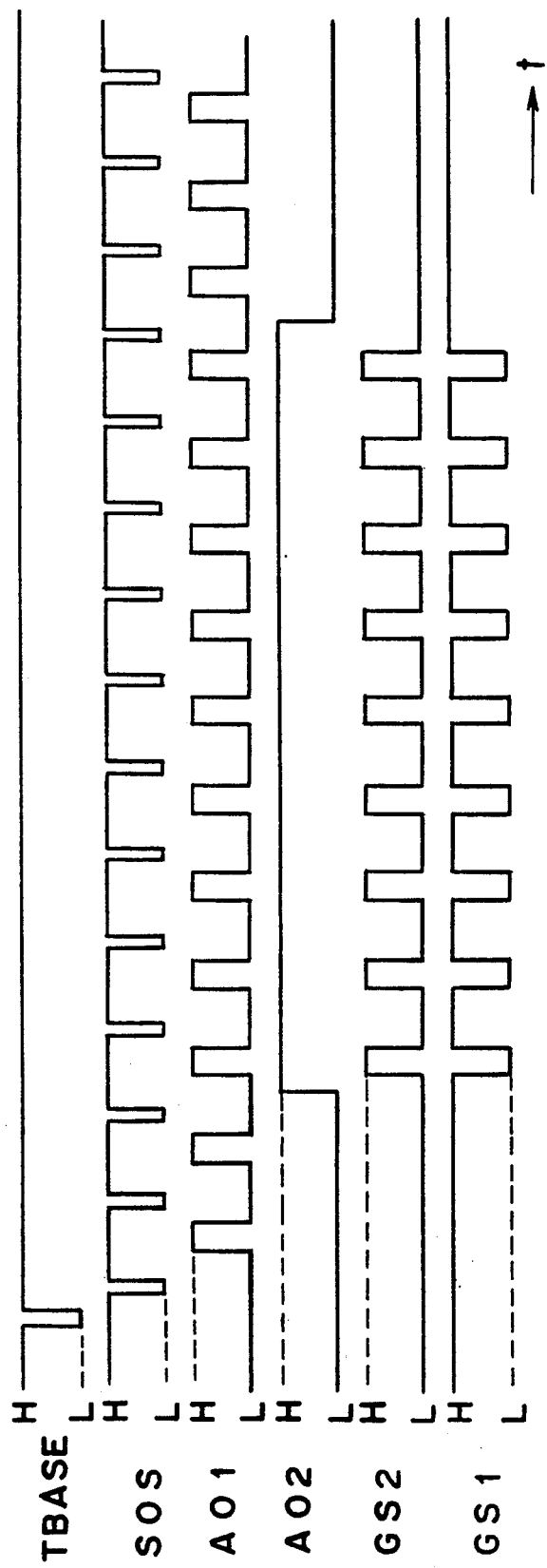

FIG. 7(A), 7(B) and 7(C) are timing charts for showing actions of the switching signal generation circuit 73.

As shown in FIG. 7(A), each of the up-counters CT1 and CT2 resets the output signal thereof from "high" level to "low" level at the timing of the drop of the SOS signal, increments the count value by one at the timing of every clock signal CLOCK and raises the output signal from "low" level to "high" level when the count value becomes equal to the value predetermined by the CPU1.

When the output signal C01 of the up-counter CT1 is in "high" level and that C02 of the up-counter CT2 is in "low" level, an area indicating signal A01 is outputted to indicate that the coordinate X in the main scan direction is in a range from $x_1$ to $x_2$.

Also, as shown in FIG. 7(B), each of the up-counters CT3 and CT4 resets the output signal from "high" level to "low" level at the timing of the drop of the TBASE signal, increments the count value by one at the timing of every clock signal CLOCK and raises the output signal from "low" level to "high" level when the count value becomes equal to the value preset by the CPU1.

When the output signal C03 of the up-counter CT3 is in "high" level and the output signal C04 of the up-counter CT4 is in "low" level, an area indicating signal A02 is outputted to indicate that the coordinate Y in the subscan direction is in a range from $y_1$ to $y_2$.

As shown in FIG. 7(C), upon start of scan for each page of the document, the page start signal TBASE of "low" level is inputted and, then, the SOS signal of "low" level is inputted upon each start of scan in the main scan direction X. If both area indicating signals A01 and A02 are in "high" level, the switching signal GS2 of "high" level and the switching signal GS1 of "low" level are outputted to the gain switching circuit 65 to indicate the area of the half-tone image. In areas other than the area of the half-tone image HM, the switching signal GS1 of "high" level and the switching signal GS2 of "low" level are outputted to the gain switching circuit 65 to indicate that the present area is not the area of the half-tone image HM.

The gain switching circuit 65 switches the amplification gain for the driving signal LDP of the laser diode LD between the first gain and the second gain smaller than the first one responsive to the switching signals GS1 and GS2.

It is to be noted that the following variations are employable in the present invention;

(a) Switching the amplification gain between an area of a half-tone image and that of a character image including only characters.

(b) Switching two amplification gains with respect to every line in the main scan direction alternatively. In this case, a document image is reproduced with an intermediate $\gamma$-characteristic between the $\gamma$-characteristics 91 and 92.

(c) Switching the amplification gain in each of four printing processes in yellow, magenta, cyan and black colors.

In this case, it becomes possible to vary the tone of each color. For example, if the printing processes in magenta, cyan and black are made using the $\gamma$-characteristic 92 and the printing process in yellow is made using the $\gamma$-characteristic 91, the yellow tone is emphasized in a print obtained.

(d) Determining coordinates regarding an area of a half-tone image by pre-scanning a document without using the input device 72.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An image forming apparatus for forming an image on a recording medium by scanning a laser beam on said recording medium including:
   reading means for reading a halftone image and a character image and outputting analog image signals having a plurality of gradations,
   an amplifier means for amplifying said analog signals,
   a laser emitting means for scanning a laser beam on said recording medium so as to produce an image of the original on said recording medium,
   a driving means for supplying an energizing current responsive to said analog signals amplified to said laser emitting means, and
   an altering means for altering the gain of said amplifier means so as to amplify image signals responsive to said halftone image at a first amplification degree and image signals responsive to said character image at a second amplification degree higher than the first one.

2. The image forming apparatus as claimed in claim 1, in which
   said reading means has a photo-electro conversion device for outputting primary analog image signals responsive to the density of a document, an analog to digital conversion means for converting said primary analog image signals to primary digital image signals a correction means for performing a predetermined γ-correction to said primary digital image signals to convert them to secondary digital image signals, and a digital to analog conversion means for converting said secondary digital image signals to secondary analog image signals and said amplifier means amplifies said secondary analog image signals.

3. An image forming apparatus for forming an image on a recording medium by scanning a laser beam on said recording medium including:

an area designating means for designating respective areas responsive to halftone and character images of a document, a reading means for reading an image of the document and outputting analog image signals having a plurality of gradations, an amplifier means for amplifying said analog signals, a laser emitting means for scanning a laser beam on said recording medium so as to produce an image of the original on said recording medium, a driving means for supplying an energizing current responsive to said analog signals amplified to said laser emitting means, and an altering means for altering the gain of said amplifier means so as to amplify image signals responsive to said halftone image area at a first amplification degree and image signals responsive to said character image at a second amplification degree higher than the first one.

4. The image forming apparatus as claimed in claim 3, in which said reading means has a photo-electro conversion device for outputting primary analog image signals responsive to the density of a document, an apparatus to digital conversion means for converting said primary analog image signals to primary digital image signals, a correction means for performing a predetermined γ-correction to said primary digital image signals to convert them to secondary digital image signals, and a digital to analog conversion means for converting said secondary digital image signals to secondary analog image signals and said amplifier means amplifies said secondary analog image signals.

5. An image forming method for an image forming apparatus which forms an image on a recording medium by scanning a laser beam on said recording medium including the following steps:

reading an image of a document including a halftone image area and a character image area and outputting analog image signals having a plurality of gradations, amplifying image signals responsive to a halftone image area at a first amplification degree and image signals responsive to said character image area at a second amplification degree higher than the first one, supplying an energizing current responsive to said image signals amplified to said laser emission means, and scanning a laser beam on said recording medium in base of said energizing current, whereby forming an image corresponding to the document on said recording medium.

6. The image forming method as claimed in claim 5 further including the following step:

designating respective areas responsive to half-tone and character images of a document.

7. An image forming method for an image forming apparatus which forms an image on a recording medium by scanning a laser beam on said recording medium including the following steps:

outputting primary analog image signals responsive to the density of a document, converting said primary analog image signals to primary digital image signals, performing a predetermined γ-correction to said primary digital image signals to convert them to secondary digital image signals, converting said secondary digital image signals to secondary analog image signals, amplifying secondary analog image signals responsive to said halftone image area at a first amplification degree and those responsive to said character image area at a second amplification degree higher than the first one and supplying an energizing current responsive to said secondary analog image signals to said laser emission device scanning a laser beam on said recording medium in base of said energizing current, whereby forming an image corresponding to the document on said recording medium.

* * * * *